United States Patent [19]
Kawaberi et al.

[11] Patent Number: 5,260,628
[45] Date of Patent: Nov. 9, 1993

[54] DEFLECTION DISTORTION CORRECTION CIRCUIT

[75] Inventors: Seiji Kawaberi, Kanagawa; Takeshi Shoji, Chiba, both of Japan

[73] Assignee: Sony Corporation, Tokyo, Japan

[21] Appl. No.: 956,345

[22] Filed: Oct. 5, 1992

[30] Foreign Application Priority Data

Oct. 14, 1991 [JP] Japan .................. 3-293740

[51] Int. Cl.$^5$ .................. G09G 1/04; H01J 29/70
[52] U.S. Cl. .................. 315/371; 315/395; 315/408
[58] Field of Search .............. 315/371, 393, 395, 403, 315/408

[56] References Cited

U.S. PATENT DOCUMENTS 3,479,554 11/1969 Kramer ........................ 315/371
3,949,269 4/1976 Wheeler ....................... 315/371

Primary Examiner—Gregory C. Issing
Attorney, Agent, or Firm—Lewis H. Eslinger; Jay H. Maioli

[57] ABSTRACT

A vertical deflection distortion correction circuit, wherein there are provided a vertical deflection output circuit, a damping circuit, a vertical deflection yoke and a resonance circuit. A current is resonated in the resonance circuit, and on the other hand, a vertical deflection current is derived from the vertical deflection output circuit and supplied to the vertical deflection yoke. Then, the resonated current is superimposed on the vertical deflection current. The superimposed vertical deflection current is finally supplied to the vertical deflection yoke. The resonance circuit is constructed of an LC parallel circuit and a switching element circuit. The switching element circuit is compose of either FETs, or thyristors.

6 Claims, 8 Drawing Sheets

DEFLECTION DISTORTION CORRECTION CIRCUIT

BACKGROUND OF THE INVENTION

The present invention generally relates to a deflection distortion correction circuit for a television receiver. More specifically, the present invention is directed to a vertical deflection distortion correction circuit at high precision, suitable for a large-screen television receiver, for instance.

Description of the Prior Art

Conventionally, vertical (upper and lower) pincushion distortion is known as typical deflection distortion of a television receiver. FIG. 1 represents an example of vertical pincushion distortion on a television screen. In FIG. 1, a screen 60 represents a front screen of a television receiver, and a raster 61 shows a pincushion-distorted raster. Originally, the screen 60 must be positioned parallel to the raster 61 and must coincide with the raster 61. However, the raster 61 is distorted in such a pincushion as shown in FIG. 1, resulting in a distorted picture displayed on the screen 60.

Conventionally, the vertical pincushion distortion is corrected by employing the vertical deflection distortion correction circuit as shown in FIG. 2. In FIG. 2, the vertical deflection output circuit 70 is connected to the vertical deflection yoke V-DY which is connected to a resonance circuit 71. The resonance circuit is constructed of a capacitor C, a phase controlling coil PAC and a secondary coil of a resonance transformer (saturable transformer) V.PCT. That is, this resonance circuit is made of a parallel circuit of the capacitor C and a series circuit of the phase controlling coil and the resonance transformer. To a primary coil of the resonance transformer V.PCT, a pulse with the horizontal deflection period is inputted, and then the resonance current (distortion correction current) $I_2$ flows through the resonance circuit 71. Then, this resonance current $I_2$ is superimposed with the sawtooth vertical deflection current $I_1$ produced from the vertical deflection output circuit 70.

An operation of the conventional vertical deflection distortion correction circuit will now be described. From the vertical deflection output circuit 70, a vertical deflection current $I_1$ is outputted which is changed in a sawtooth form at the vertical deflection period. Upon input of a pulse into the primary coil of the resonance transformer V.PCT, a sinewave resonance current (i.e., distortion correction current) $I_2$ flows into the resonance circuit 71 constructed of the secondary coil of the resonance transformer V.PCT, the phase controlling coil PAC and the capacitor C. Then, such a current result from the distortion correction current $I_2$ being superimposed on the sawtooth vertical deflection current $I_1$, flows into the vertical deflection yoke V-DY.

FIG. 3 represents a waveform of such a current flowing through the vertical defection coil V-DY. In FIG. 3, a sawtooth wave 80 corresponds to a waveform of the original vertical deflection current $I_1$, and sinewaves 81 to 83 correspond to waveforms of the distortion correction current $I_2$ used for the upper portion of the screen 60 shown in FIG. 1 and the lower portion thereof. The vertical deflection current $I_1$ is varied at the vertical deflection period 84, whereas the distortion correction current $I_2$ is varied at the horizontal deflection period 85.

As shown in FIG. 3, a composite waveform of the vertical deflection current $I_2$ corresponds to such a waveform that the sinewaves have been superimposed on the sawtooth wave 80. The polarity of the sinewaves 81 to 83 correspond to that of the vertical deflection current $I_2$ waveform, and the levels of the sinewaves are directly proportional to the level of the vertical deflection current $I_1$. The levels of the sinewaves 81 and 83 at the upper portion and the lower portion on the screen 60 shown in FIG. 1 become large, and to the contrary, the level of the sinewave 82 at the center portion of the screen 60 becomes small. The polarities of the sinewaves 81 and 83 at the upper portion and the lower portion on the screen 60 are opposite to each other.

There is a problem in the conventional vertical deflection distortion correction circuit that such a specific transformer as a saturable transformer is required, and there is poor linearity with respect to the vertical deflection current and the horizontal deflection pulse. Also, it is difficult to achieve pincushion correction at high precision due to fluctuation in the phase. Moreover, since the sinewave is employed as the deflection distortion correction wave, it is impossible to correct the trapezoidal distortion.

Summary of the Invention

The present invention has been made in an attempt to solve the above-described problems of the conventional deflection distortion correction circuit, and therefore, has an object to provide a deflection distortion correction circuit having good linearity with respect to a vertical deflection current and a horizontal deflection pulse, having less phase fluctuation, and capable of realizing high-precision pincushion distortion correction.

To achieve the above-described object and other features, a deflection distortion correction circuit, according to the present invention, is characterized in that a switching element (switch "SW") is employed in a resonance circuit 3, the switching element is turned ON/OFF at the horizontal deflection period (horizontal deflection period 5), and a current resonated in the resonance circuit 3 is superimposed on a deflection current (vertical deflection current $I_1$) which is varied in a sawtooth wave at the vertical deflection period, and the resultant current flows into a vertical deflection yoke (vertical deflection yoke V-DY), whereby vertical deflection distortion is corrected.

In the deflection distortion correction circuit with the above-described circuit arrangement, the switching element (switch SW) employed in the resonance circuit 3 is turned ON/OFF at the horizontal deflection period 5, the parabolic current which has been produced by the resonance that has occurred in the resonance circuit 3 is superimposed on the deflection current (vertical deflection current $I_1$), and the superimposed current flows into the deflection yoke (vertical deflection yoke V-DY). As a result, the vertical deflection distortion can be corrected.

BRIEF DESCRIPTION OF THE DRAWINGS

The above-described object, and other useful and novel features of the present invention will become more readily apparent in the following description with reference to the accompanying drawings, in which.

DETAILED DESCRIPTION OF THE PREFERRED EMBODIMENTS

Figure 1:
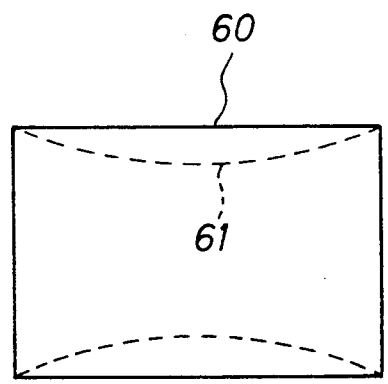
FIG. 1 illustrates an example of the vertical pincushion distortion.
Figure 2:
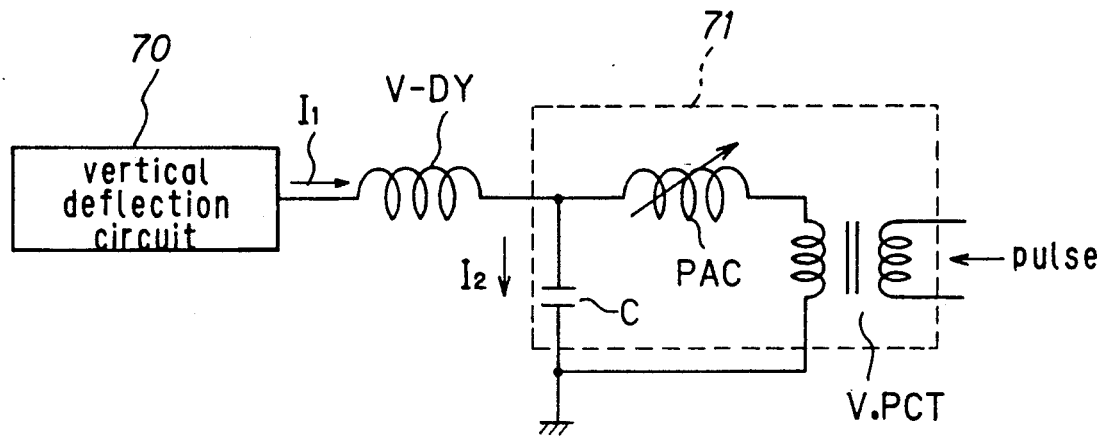
FIG. 2 is a schematic circuit diagram of showing an arrangement of the conventional deflection distortion correction circuit.
Figure 3:
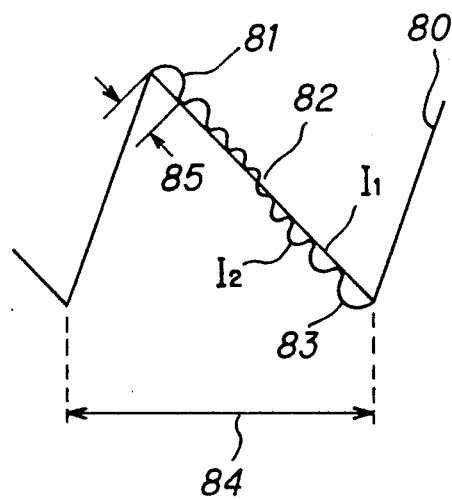
FIG. 3 is an explanatory diagram for explaining a vertical deflection current waveform of the conventional deflection distortion correction circuit shown in FIG. 2.
Figure 4:
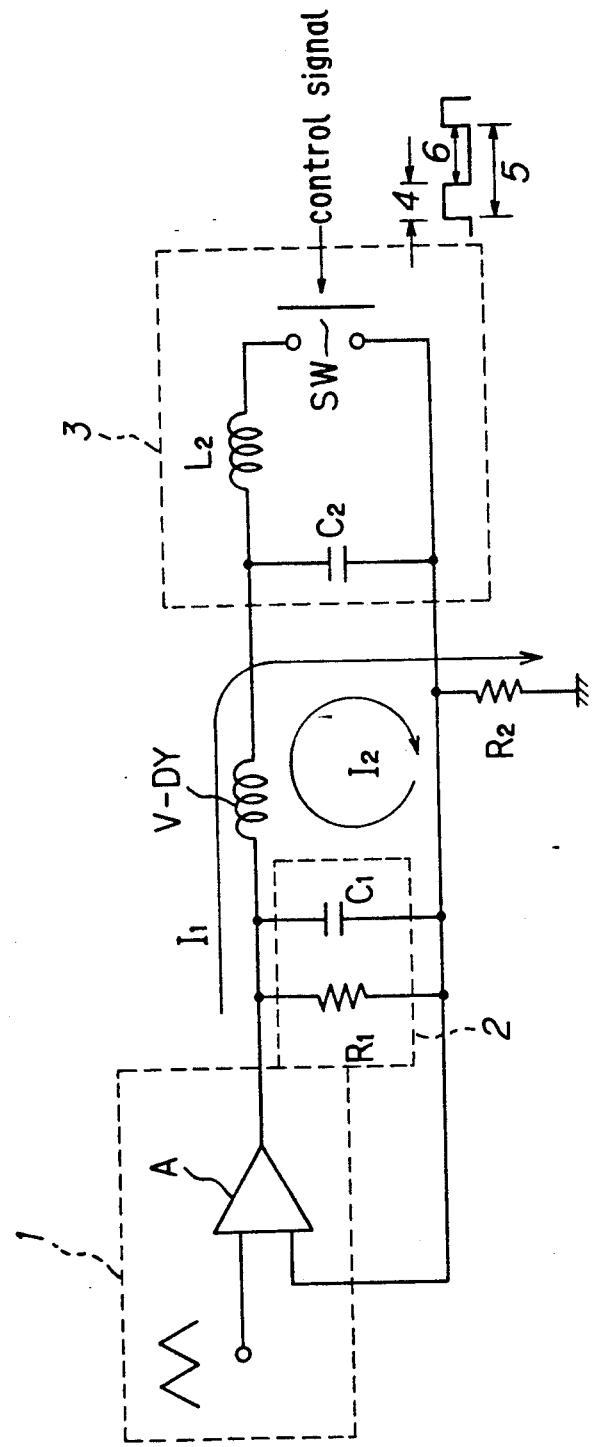
FIG. 4 is a circuit diagram for representing an arrangement of a deflection distortion correction circuit according to a preferred embodiment of the present invention.

FIG. 4 represents a circuit arrangement of a deflection distortion correction circuit according to one preferred embodiment of the present invention.

In FIG. 4, a vertical deflection output circuit 1 including an amplifier "A" is connected to a vertical deflection yoke V-DY and a damping circuit 2. A resistor R1 is connected parallel to a capacitor C1, which constitute the damping circuit 2. A coil $L_2$ is connected parallel to a capacitor $C_2$ via a switch SW, which constitute a resonance circuit 3. The resonance circuit 3 is connected to the vertical deflection yoke V-DY and the damping circuit 2. Both the damping circuit 2 and the resonance circuit 3 are grounded via a current detecting circuit $R_2$. A vertical deflection current $I_1$ is a sawtooth-shaped current outputted from the vertical deflection output circuit 1, and a parabolic current $I_2$ is a correction current flowing through the damping circuit 2, vertical deflection yoke V-DY and resonance circuit 3. The switch SW is turned ON/OFF by a control signal. The control signal is varied at a horizontal deflection period 5, and becomes a logic "H" level during a flyback period 4 and also a logic "L" level during the remaining scanning period 6.

Operation of the deflection distortion correction circuit shown in FIG. 4 according to the preferred embodiment will now be described. The sawtooth current $I_1$ derived from the vertical deflection output circuit 1 flows through a signal path of the vertical deflection yoke V-DY, the resonance circuit 3 and the resistor R2. At this time, energy is reserved in the capacitor $C_2$, the switch SW is turned ON during the horizontal flyback period 4, and also electron charge stored in the capacitor C2 is discharged via the coil L2 during this flyback period 4. Thereafter, even after a voltage across the capacitor $C_2$ becomes 0 (zero), the current of the resonance circuit 3 continues to flows due to the resonance phenomenon caused by the coil $L_2$ and the capacitor $C_2$. However, a circuit constant of this circuit is so designed that when the current of the coil $L_2$ becomes zero, the switch SW is turned OFF in response to the control signal. At this time, a pulse voltage produced between both ends of the capacitor $C_2$ is directly proportional to the vertical deflection current $I_1$, the polarity of which pulse voltage corresponds to that o the vertical deflection current $I_1$.

During the horizontal scanning period 6, the switch SW is turned OFF, and then the resonant parabolic current $I_2$ flows through the signal path of the vertical deflection yoke V-DY, the resonance circuit 3 (capacitor $C_2$), and the damping circuit 2.

It should be noted that the damping circuit 2 bypasses the parabolic current $I_2$ having the horizontal deflection frequency component with respect to the vertical deflection output circuit 1. As a consequence, it is possible to avoid an oscillation and a ringing effect of the current flowing through the vertical deflection yoke V-DY. If there is no damping circuit 2, since a voltage be approximately 160 V is produced across the terminals of the vertical deflection yoke V-DY, the amplifier "A" of the vertical deflection output circuit 1 must withstand such a high voltage. However, if the damping circuit 2 is connected to this deflection distortion correction circuit, since the parabolic current $I_2$ flows as represented in FIG. 4, a voltage, e.g., on the order of 50 V is applied to the amplifier "A".

Figure 5:
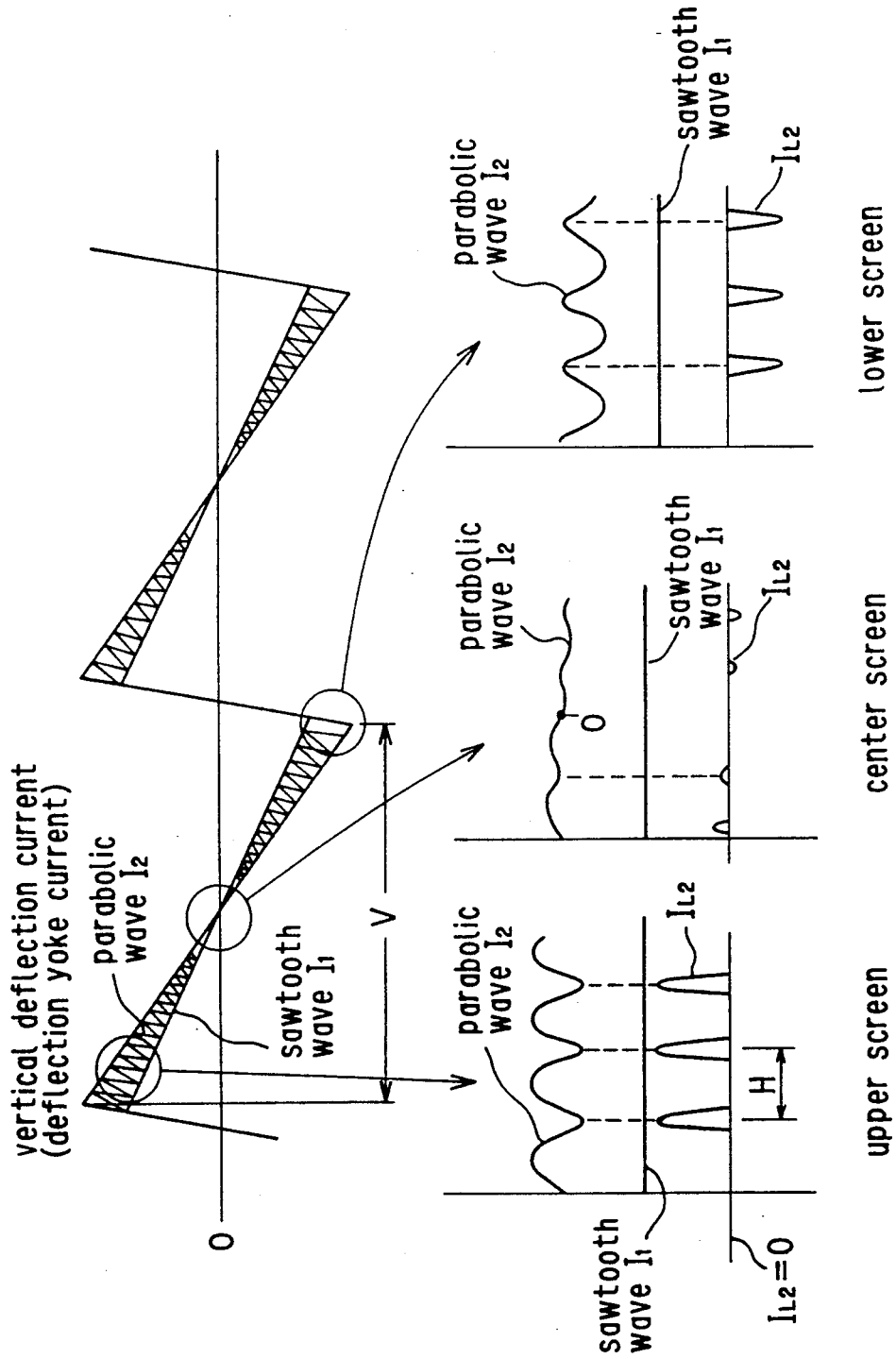
FIG. 5 is an explanatory diagram for explaining current waveforms at various circuit portions of the deflection distortion correction circuit of FIG. 4.

In FIG. 5, there are shown waveforms of currents flowing through the vertical deflection yoke V-DY. As represented in FIG. 5, the sawtooth current $I_1$ is varied at the vertical deflection period. Then, the parabolic current $I_2$ is superimposed on this sawtooth current $I_1$. A level of this parabolic current $I_2$ becomes high when a level of the sawtooth current $I_1$ becomes high, and conversely, when the level of the sawtooth current $I_1$ becomes low, the level of the parabolic current $I_2$ becomes low. Also, when the polarity of the sawtooth current $I_1$ becomes positive, the polarity of the parabolic current $I_2$ becomes similarly positive. When the polarity of the sawtooth current $I_1$ becomes negative, that of the parabolic current $I_2$ becomes negative. In this preferred embodiment, since it is so designed that the polarity of the sawtooth current $I_1$ becomes positive at an upper portion of a television screen and becomes negative at a lower portion of the screen, the polarity of the parabolic current $I_2$ becomes positive at the upper portion of the screen and negative at the lower portion of the screen. Then, the levels of the sawtooth and parabolic currents become substantially zero at a center portion of the screen. As is apparent from FIG. 5, a pulsatory current $IL_2$ flows through the coil $L_2$ at the timing when the switch SW is turned ON during the horizontal flyback period.

As previously explained, since the vertical deflection current $I_1$ flows having the sawtooth shape, is varied at the vertical deflection period and on which the parabolic correction current $I_2$ changing at the horizontal deflection period is superimposed, the vertical pincushion distortion can be corrected.

Figure 6:
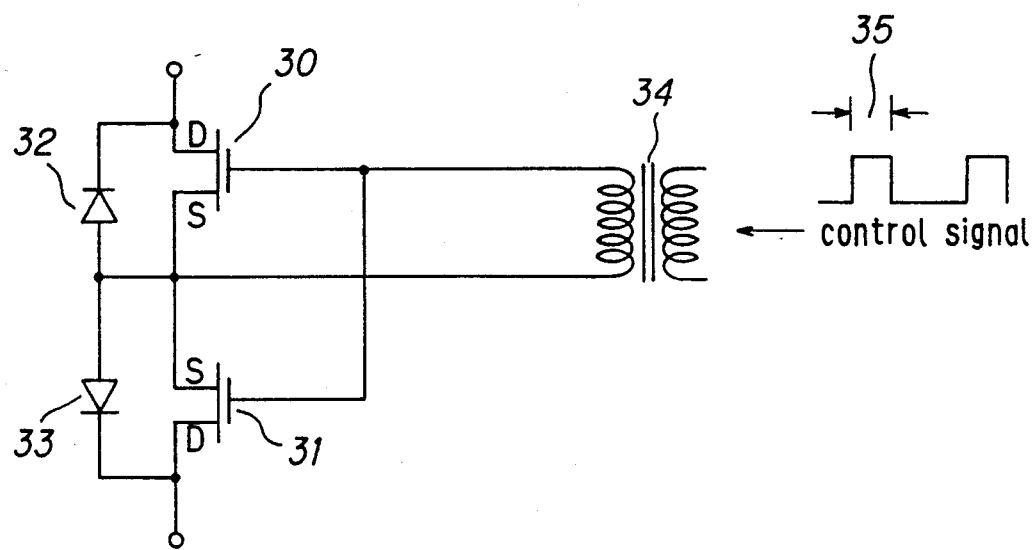
- FIG. 6 is a circuit diagram of one example of the switch circuit SW shown in FIG. 4 which utilizes FETs.

Now, a description will be made of a concrete circuit arrangement of the switch SW shown in FIG. 4. FIG. 6 represents an example of a circuit arrangement in which the switch SW is constructed by employing FETs. In this preferred embodiment, two FETs (power MOSFET) 30 and 31 are connected in such a manner that sources thereof are commonly connected to each other. Parasitic diodes 32 and 33 are connected between a source and a drain of each FET. Each of the gates of these FETs 30 and 31 is connected to one terminal of a secondary coil of a transformer 34, and each of the sources thereof is connected to the other terminal of the secondary coil of the transformer 34.

Upon input of a pulse 35 having a logic "H" level into the primary coil of the transformer 34, both of the FETs 30 and 31 are turned ON. As a result, for instance, a positive-direction current flows in a signal path of the drain-source of the FET 30 and the parasitic diode 33 of the FET 31, whereas a negative-direction current flows in a signal path of the drain-source of the FET 31 and the parasitic diode 32. When the pulse supplied from the transformer 34 becomes a logic "L" level, both of these FETs 30 and 31 are turned OFF. At this time, since the parasitic diodes 32 and 33 are connected in the opposite directions with respect to each other, current flow in any direction can be completely blocked.

To the contrary, for example, if only one power MOSFET is employed, even when this power MOSFET is turned OFF, the current flows through the parasitic diode, so that the signal path cannot be completely cut off. Accordingly, as shown in this preferred embodiment, it is preferable to constitute the switch by connecting the two FETs in a series circuit.

Figure 7:
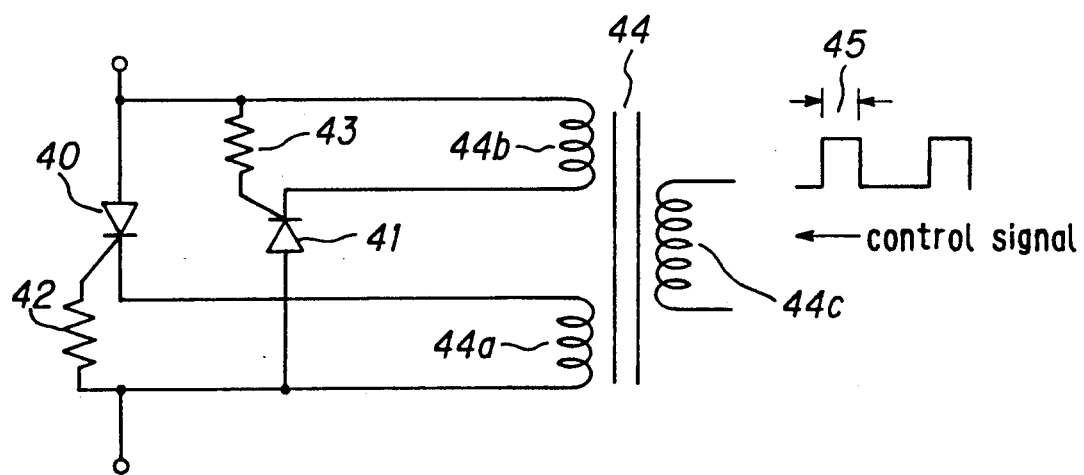
FIG. 7 is a circuit diagram of another example of the switch circuit SW shown in FIG. 4, which utilizes SCRs.

FIG. 7 indicates an example of such an arrangement that thyristors (SCR) are employed as the switch of FIG. 4. In this circuit arrangement of FIG. 7, an anode of a thyristor 40 is connected to one signal input terminal and a gate of this thyristor 40 is connected via a resistor 42 to the other signal input terminal. Then, a cathode of the thyristor 40 is connected to one terminal of a secondary coil 44a of a transformer 44, and the other terminal of the secondary coil 44a is connected to the other end of the resistor 42. Similarly, a gate of another thyristor 41 is connected via a resistor 43 to one signal input terminal, and an anode of this thyristor 41 is connected to the other signal input terminal. A cathode of the thyristor 41 is connected to one terminal of a secondary coil 44b of the above-explained transformer 44, and the other terminal of this secondary coil 44b is connected to both the resistor 43 and one signal input terminal. Then, a predetermined control signal is supplied from a primary coil 44c of the transformer 44.

A control signal is inputted to the primary coil 44c of the transformer 44 and then pulses are produced from the secondary coils 44a and 44b. These pulses are applied to the cathodes of the respective thyristors 40 and 41. As a result, the thyristors 40 and 41 are turned ON, so that, for instance, a positive-direction current flows from one signal input terminal via the anode of the thyristor 40, the gate thereof and the resistor 42 to the other signal input terminal, and also a negative-direction signal flows from the other signal input terminal via the anode of the thyristor 41, the gate thereof and the resistor 43 to the other signal input terminal.

Figure 8A:
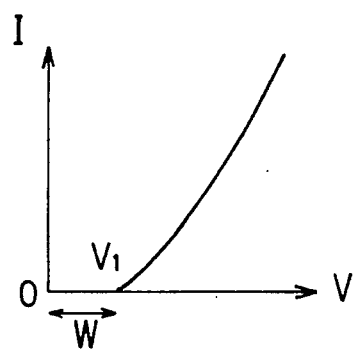
FIGS. 8a and 8b are explanatory diagrams for explaining characteristics of a thyristor.
Figure 8B:
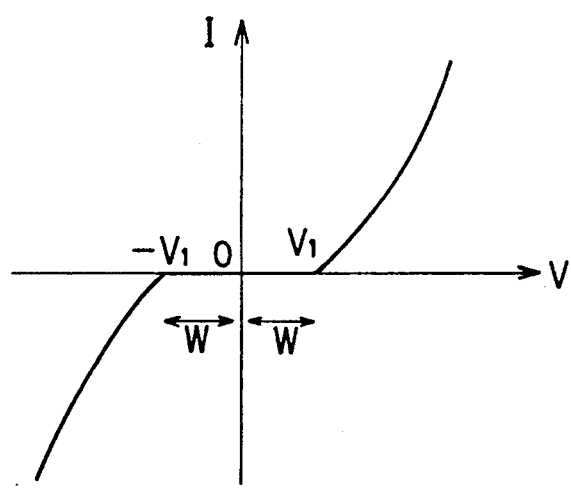
Figure 9:
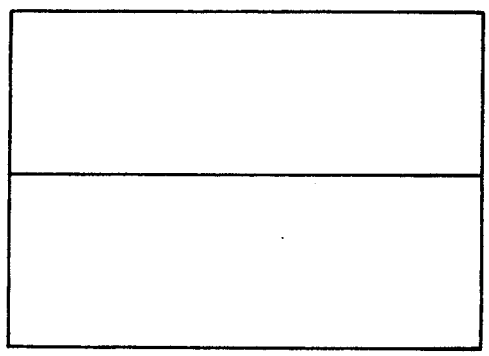
FIG. 9 shows a screen and a horizontal line appearing thereon when the thyristor switch is operated under bad conditions.

In general, a thyristor is ignited by applying a predetermined voltage between a gate of this thyristor and a cathode thereof. Then, as shown in FIG. 8a, when this applied voltage exceeds a predetermined voltage "$V_1$", the thyristor is turned ON. In other words, a period "$W_1$" defined such that the voltage between the gate and the cathode reaches a predetermined voltage $V_1$, represents insensitivity. As a consequence, in the case that the currents flow in both the positive and negative directions with employment of two thyristors 40 and 41, as represented in FIG. 7, insensitivity as defined by a period of $\pm W$ is produced see FIG. 8b). Accordingly, in order for a current to continuously flow by sequentially changing a voltage, for instance, when the voltage is gradually increased from the negative direction and reaches "$-V_1$", this voltage must be varied up to "$+V_1$" in a stepwise form at the next instant. If such a stepwise voltage increase would not be employed, since a pitch of a scanning line on a screen is locally varied at this insensitivity portion, for instance, a horizontal line will appear on this screen as illustrated in FIG. 9.

Figure 10:
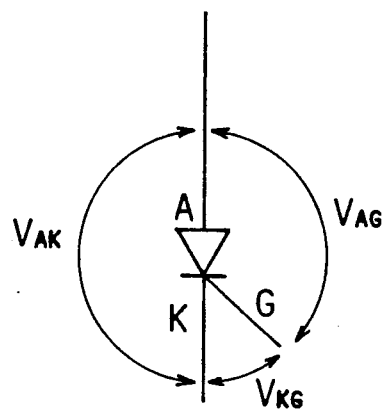
FIG. 10 schematically illustrates voltage differences of a thyristor.

In accordance with this preferred embodiment, to avoid such a conventional problem, the thyristors 40 and 41 are not ignited via the gates thereof, but ignited via the cathodes thereof. In other words, as shown in FIG. 10, assuming now that an anode of a thyristor is indicated by "A", a cathode thereof is denoted by "K", and a gate thereof is shown by "G", and also a voltage between the anode and the cathode is represented by "$V_{AK}$", a voltage between the cathode and the gate is indicated by "$V_{KG}$", a voltage between the anode and the gate is denoted by "$V_{AG}$", when comparisons are made between these voltages, the voltage $V_{AK}$ between the anode and the cathode is the highest voltage among the voltages $V_{KG}$ and $V_{AG}$. Then, the voltage $V_{KG}$ between the cathode and the gate is the second highest voltage, and the voltage $V_{AG}$ between the anode and the gate is the lowest voltage. As previously explained, since the signal path between the anode and the gate, not between the anode and the cathode is employed in this preferred embodiment, a forward voltage drop between the anode and the gate becomes a minimum. As a consequence, a width of the insensitivity can also be made narrow, a width of a voltage which is stepwise varied can be also made narrow in the case that the current flows in both the positive and negative directions as indicated in FIG. 7. As a result, even when a signal which is stepwise changed is applied to the primary coil 44c of the transformer 44, the thyristors 40 and 41 can quickly respond to this stepwise signal, so that it can be prevented that the horizontal line appears on the screen as shown in FIG. 9.

Figure 11:
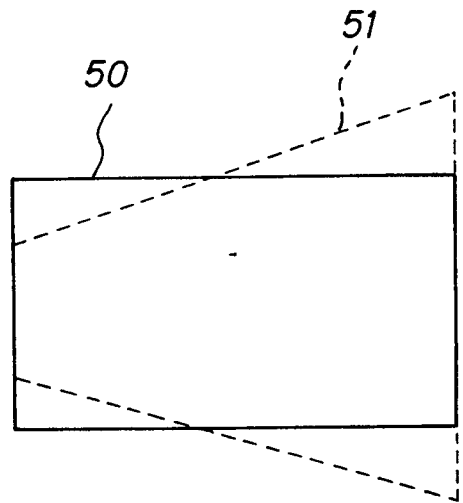
FIG. 11 is an explanatory diagram for explaining horizontal trapezoidal distortion correction performed in the deflection distortion correction circuit of FIG. 4.

As previously stated in this preferred embodiment, the parabolic correction current which is superimposed on the sawtooth current is produced by switching the switch SW. Thus, a horizontal trapezoidal distortion as indicated in FIG. 11 can be corrected by properly adjusting the switching timing of the switch SW. That is to say, as illustrated in FIG. 11, to correct such a raster 50 having horizontal trapezoidal distortion that the height of the righthand screen becomes high, and the height of the lefthand screen becomes low, as a correct raster 51, the generation timing of the parabolic wave at the horizontal scanning period is set to be fast. Conversely, to correct such a horizontal trapezoidal distortion that the height of the lefthand screen becomes high and the height of the righthand screen becomes low, the generation timing of the parabolic wave is delayed.

It should be noted that although a signal wherein a parabolic wave is superimposed on a sawtooth wave has been previously produced, and then this superimposed signal has been supplied to the vertical deflection coil V-DY, such signal generation may consume high power. However, in accordance with the arrangement of the present invention, since the resonance current is utilized, total power consumption becomes low.

While the deflection distortion correction circuit according to the present invention has been described in detail, since the correction current is generated by switching the switching element, such a specific transformer as a saturable transformer is not required. Also, linearity can be improved with respect to the vertical deflection current and the horizontal deflection pulse. Then, since the phase fluctuation can be controlled, highprecision pincushion distortion correction can be realized. Furthermore, since the parabolic wave is produced, the horizontal trapezoidal distortion can be corrected.

What is claimed is:

1. A deflection distortion correction circuit wherein a current resonated in a resonance circuit is superimposed on a vertical deflection current and said superimposed current is supplied to a vertical deflection yoke to correct vertical deflection distortion, characterized in that:

a switching circuit connected in said resonance circuit comprises a first thyristor having an anode connected to a first signal terminal of said resonance circuit, a gate connected to a second signal terminal of said resonance circuit, and a cathode;

a second thyristor having an anode connected to said second signal terminal, a gate connected to said first signal terminal, and a cathode;

a transformer constructed of a primary winding for receiving an ignition signal, a first secondary winding having one end connected to said cathode of said first thyristor and the other end connected to said second signal terminal, whereby said first signal terminal is connected to said second signal terminal through a signal path constructed of said anode and said gate, and said first thyristor is ignited by said cathode in response to said ignition signal applied to said primary winding and a second secondary winding having one end connected to said cathode of said second thyristor and the other end connected to said first signal terminal, whereby said first thyristor and said second thyristor are cross-coupled with each other between said first signal terminal and said second signal terminal; and said switching circuit is turned ON/OFF at a horizontal deflection period, whereby said current resonated in said resonance circuit is superimposed on said vertical deflection current and said resultant current flows into said vertical deflection yoke so as to correct sid vertical deflection distortion.

2. A deflection distortion correction circuit as claimed in claim 1, wherein said resonance circuit includes:

a capacitor; and an inductor connected in parallel through said switching circuit with said capacitor.

3. A deflection distortion correction circuit as claimed in claim 1, further comprising:

a damping circuit connected to said vertical deflection yoke.

4. A deflection distortion correction circuit as claimed in claim 1, further comprising:

a first resistor interposed between said gate of said first thyristor and said second signal terminal.

5. A deflection distortion correction circuit as claimed in claim 1, further comprising:

a second resistor interposed between said gate of said second thyristor and said first signal terminal.

6. A deflection distortion correction circuit as claimed in claim 1, wherein said ignition signal is a rectangular pulse signal whose signal level is at a high logic level during a horizontal flyback period and is at a low logic level during a remainder of a horizontal scanning period.

* * * * *